(12) United States Patent  
Shi et al.

(10) Patent No.: US 8,577,923 B2  
(45) Date of Patent: Nov. 5, 2013

(54) SYSTEMS AND METHODS FOR FREEZING DATA

(75) Inventors: Jianzhuo Shi, Shanghai (CN); Haiyang Yu, Shanghai (CN)

(73) Assignee: SAP AG, Walldorf (DE)

( * ) Notice: Subject to any disclaimer, the term of this patent is extended or adjusted under 35 U.S.C. 154(b) by 356 days.

(21) Appl. No.: 12/687,301

(22) Filed: Jan. 14, 2010

(65) Prior Publication Data

US 2011/0153672 A1    Jun. 23, 2011

(30) Foreign Application Priority Data

Dec. 23, 2009    (CN) .......................... 2009 1 0259940

(51) Int. Cl.
*G06F 17/30* (2006.01)

(52) U.S. Cl.
USPC .............................. 707/792; 705/26; 711/150

(58) Field of Classification Search
USPC .............................. 707/792; 705/26; 711/150
See application file for complete search history.

(56) References Cited

U.S. PATENT DOCUMENTS

| | | | |
|---|---|---|---|
| 7,366,742 B1* | 4/2008 | Umbehocker et al. ................. 1/1 |
| 2006/0149696 A1* | 7/2006 | Pferdekaemper et al. ......... 707/1 |
| 2006/0149736 A1* | 7/2006 | Pferdekaemper et al. ......... 707/9 |
| 2007/0078701 A1* | 4/2007 | Bliznak ........................... 705/11 |
| 2008/0077612 A1* | 3/2008 | Zobin et al. ................ 707/103 R |
| 2010/0088748 A1* | 4/2010 | Gluck ............................... 726/3 |
| 2010/0211682 A1* | 8/2010 | Capomassi et al. ........... 709/226 |

* cited by examiner

*Primary Examiner* — Monica Pyo
(74) *Attorney, Agent, or Firm* — Fountainhead Law Group PC (57) ABSTRACT

In one embodiment the present invention includes a computer-implemented for determining whether or not a data object is frozen. The method comprises accessing, by a user on a computer, a first data object of a plurality of data objects in one or more computer software applications. The plurality of data objects are assigned to a plurality of entities, where each entity specifies a category, and each of the plurality of data objects belong to a specific entity. The method determines if the first data object is frozen based on a relationship between the first entity and a second entity.

18 Claims, 6 Drawing Sheets

SYSTEMS AND METHODS FOR FREEZING DATA

BACKGROUND

This application claims priority to Chinese Patent Application No. 200910259940.1 filed Dec. 23, 2009 in the Peoples Republic of China.

BACKGROUND

The present invention relates to computer implemented processes and systems including software, and in particular, to systems and methods for freezing data.

Organizations have always had a need to monitor their business activities. In the wake of financial scandals like Enron and the enactment of Sarbanes-Oxley, organizations have increasingly turned to governance, risk management, and compliance (GRC) and separation of duties principles to manage and regulate their business activities. Generally, the organizations use these concepts to detect, prevent, and remedy fraud, crime, and other illicit behavior that may occur within an organization.

Generally, many actions (i.e., transactions or tasks) can be performed on an enterprise system. For example, possible actions include creating a vendor, paying a vendor, creating a user, approving a document, or making changes to data. To make changes to data, the data may need to be accessed in order to perform an action. To control risk in an organization, many software systems may freeze data after a particular individual in the system officially signs-off on the data (i.e., certifies that the data is accurate and compliant). Once data is frozen, it may not be changed within the system by other users. However, GRC extends to systems and processes based on rules not derived from law or regulation. For example, governance rules for a business may reflect the way a business wishes to operate.

For example, historic data may never be changed after administration officers (e.g., CEO, CEO, etc) have signed-off Sign-off is an action done by CEO/CFO to confirm the financial report, internal control records, or the like, are correct. Once data is frozen, users of the system may only have a read-only access on the frozen data. The data is frozen (or locked) to prevent any further changes.

There are currently two well known methods for preventing changes to signed-off data. First, the data may be archived. For instance, after an officer signs-off, the data can be archived immediately (e.g., in a separate data storage repository). Typically, a background job is triggered for large data sets to move the data from a local system to an archive system. In some instances, a business warehouse (BW) application may be used to perform analysis on the historical data. One problems associated with this approach is that archiving can be time consuming and data processing intensive. Since archiving takes time, the system may need to be inaccessible to users for several minutes, hours, or even days depending on the data volume and system hardware performance. To prevent any change during archiving, user login may need to be blocked during the archiving period. Additionally, once the data is archived, it becomes more difficult to access the data by one or more applications such as an Enterprise Application. Further, in many situations it is desirable to reuse commonly used data after it is frozen for other purposes. For instance, at the end of a fiscal year, an archive system may archive a previous year's data, but may be required to create new data objects for the next year with the same data, which may change, rather than reusing the existing data objects from the previous year.

Yet another approach to freezing data is flagging. Using this approach, each data object in the system that is to be frozen includes an extra flag attribute to indicate that the data object is frozen. Flagging does allow for the frozen data to be available sooner than archiving. However, flagging each data object individually can also be programmatically and computationally inefficient. Further, as with archiving, once a data object is flagged, the data is frozen and it may be difficult or impossible to reuse the data objects.

Therefore, it would be desirable to have a technique for freezing data that overcomes the problems above and others.

SUMMARY

Embodiments of the present invention improve risk analysis processing. In one embodiment the present invention includes a computer-implemented method comprising accessing, by a user on a computer, a first data object of a plurality of data objects in one or more computer software applications, wherein the plurality of data objects are assigned to a plurality of entities, each entity specifying a category, wherein each of the plurality of data objects belong to a specific entity, wherein the first data object is assigned to a first entity, wherein a second data object is assigned to a second entity, and wherein the second data object is frozen, and determining if the first data object is frozen based on a relationship between the first entity and the second entity.

In one embodiment, the determining is performed in response to the first data object being accessed.

In one embodiment, the determining comprises determining the first entity to which the first data object is assigned, accessing a registry of entities, wherein the registry specifies one or more of the plurality of entities, and wherein a particular entity is specified in the registry if a data object assigned to the particular entity is frozen or if the particular entity is related to an entity having an assigned frozen data object, and determining if the first entity is in the registry.

In one embodiment, each data object of the plurality of data objects comprising an object identification, the object identification specifying the particular entity to which a particular data object is assigned and a database identifier.

In one embodiment, said determining further comprising accessing path information, the path information specifying a relationship path from the first entity, through zero or more intermediate entities, to the second entity. In one embodiment, the relationship path is unique. In one embodiment, the relationship path is time dependent and wherein the relationship path is determined using a time stamp.

In one embodiment, said determining further comprising determining whether or not the second entity is related to the first entity using the path information, and if the second entity is related to the first entity, determining whether or not the second data object assigned to the second entity is frozen.

In one embodiment, the first object has a plurality of attribute values each having an associated time, said determining further comprising comparing at least one associated time to a frozen time, wherein if the associated time meets the frozen date, then the first data object is frozen.

In one embodiment, the associated time is a date, wherein a first attribute of the first object has an associated date, wherein the frozen time is a frozen date, and wherein the first data object is frozen if the date is before the frozen date.

In one embodiment, the associated time is a date, wherein a first attribute of the first object has an associated date, wherein the frozen time is a frozen date range, and wherein the first data object is frozen if the date is within the frozen date range.

The following detailed description and accompanying drawings provide a better understanding of the nature and advantages of the present invention.

DETAILED DESCRIPTION

Described herein are processes for freezing data objects in one or more computer software applications. The apparatuses, processes, and techniques described below may be implemented as a computer program (software) executing on one or more computers. The computer program may further be stored on a computer readable medium. The computer readable medium includes computer executable instructions that when executed on a computer system causes the system to perform the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
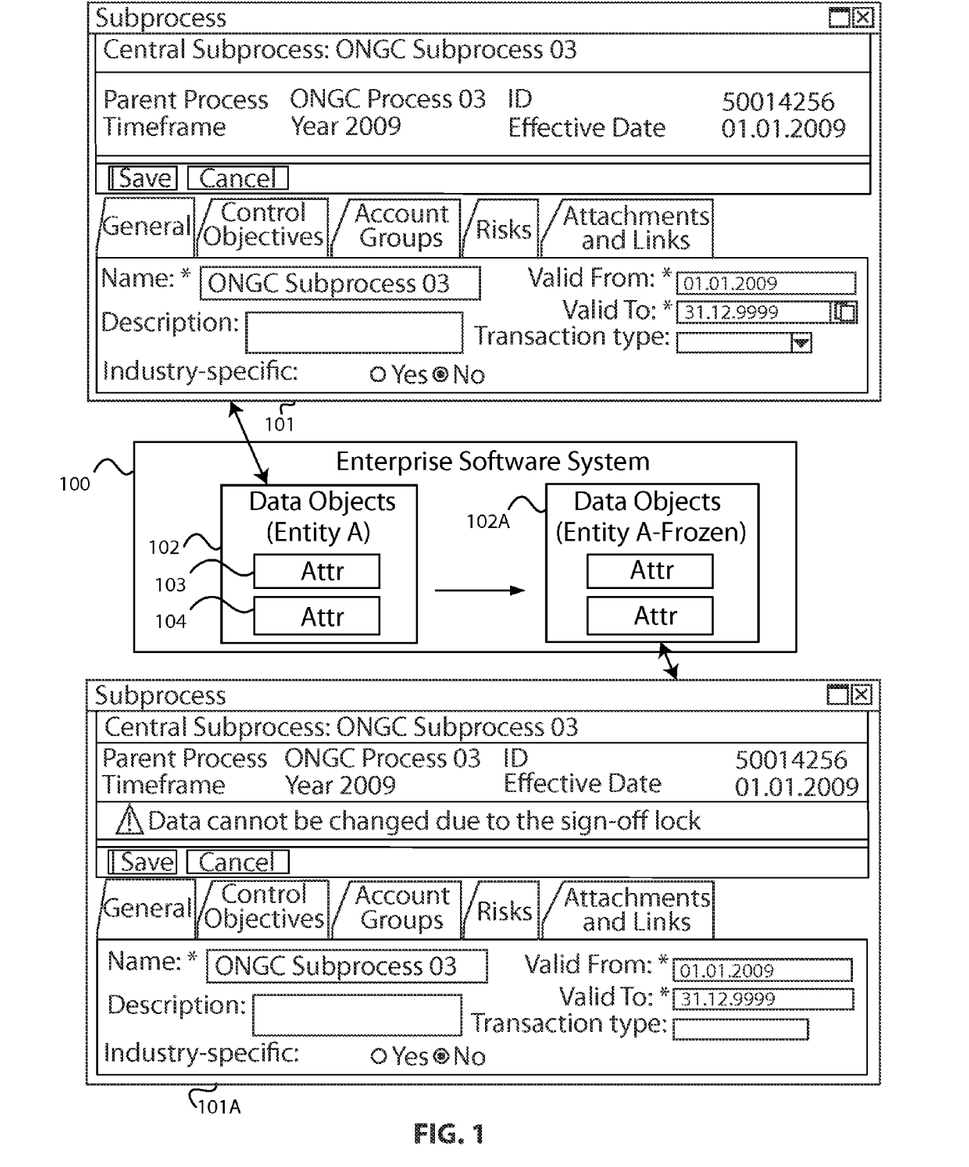
FIG. 1 illustrates freezing data objects according to one embodiment of the present invention.

FIG. 1 illustrates freezing data objects according to one embodiment of the present invention. In this example, an enterprise software system 100 executing on one or more computers may include a plurality of data objects. In some embodiments, the data object relates to how a business controls a process, subprocess or the like. A data object illustrated at 101 is an example of a subprocess data object, which may have a variety of data associated with it. As illustrated by data object 102, data objects may have data stored as attributes. A single data object may have multiple attributes for data or, as described below, for use in freezing the data object. Features and advantages of the present invention allow the frozen status of data objects to be determined on the fly. For example, if a sign-off has occurred, and one or more data objects are thereby frozen, the frozen status of other data objects in the system is determined based on relationships between entities to which the each of the data objects are assigned. As an example, a user may access data object 102, and the system may determine in real time that data object 102 is frozen as illustrated at 102A. The result is that the user will not be able to change data in data object 102A. An example frozen data object corresponding data object 101 is illustrated at 101A.

Figure 2:
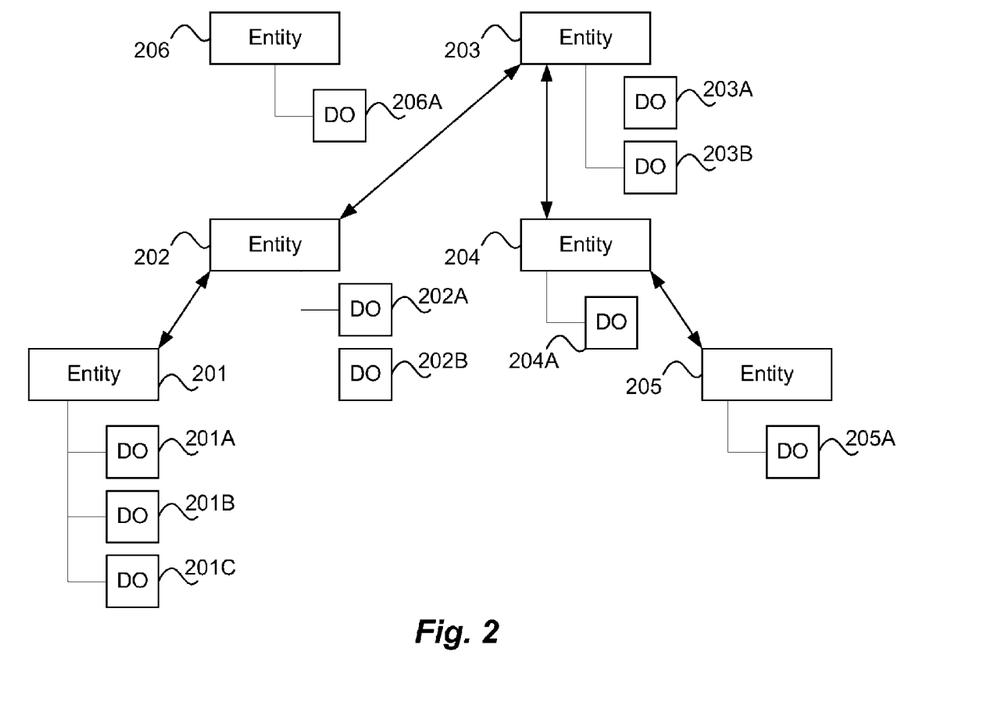
FIG. 2 illustrates data objects assigned to entities according to one embodiment of the present invention.

FIG. 2 illustrates data objects assigned to entities according to one embodiment of the present invention. Here, a plurality of data objects in a system are assigned to a plurality of entities. Each entity specifies a category. An entity may be a category of one object or multiple objects. For example, "Corporate" may be an entity and some data objects may be assigned to the Corporate entity. Similarly, Purchase Order may be an entity and purchase order data objects may be assigned to the Purchase Order entity. Similarly, Control may be an entity, and a Risk may be an entity. A wide variety of other entities may be created and data objects may be assigned to each entity. Each of the plurality of data objects belong to a specific entity. In this example, data objects 201A-C belong to entity 201. Similarly, data objects 202A-B are assigned to entity 202, data objects 203A-B are assigned to entity 203, data object 204A is assigned to entity 204, data object 205A is assigned to entity 205, and data object 206A is assigned to entity 206.

FIG. 2 further illustrates an example relationship between the entities. In this example, entity 201 and 202 are related, entities 202 and 203 are related, entities 203 and 204 are related, and entities 204 and 205 are related. For example, the entities Corporate and Purchase Order may have a relationship because one PO should be created for one corporation, or will be sent to another corporate. Similarly, entities Control and Risk will have a relationship, since one control may be designed to lower a risk in company operations, for example. As mentioned above, a wide variety of entities and relationships between entities may exist. Some entities may be isolated, such as entity 206 with assigned data object 206A. Some form of relationship typically exists between entities within a system. Some relationships are specified as describe below, but other relationships need not be specified or created. Relationships may exist because of business logic, for example, or other preexisting software constructs. That is, the data structure recording the relationships is updated when rules involving entities are created or modified. Relationships stored in these links can change with time. Additionally, many relationship paths between entities may exist. In some embodiments, the entities are linked by graphs with cycles. An entity can link to an entity in the same category.

Figure 3A:
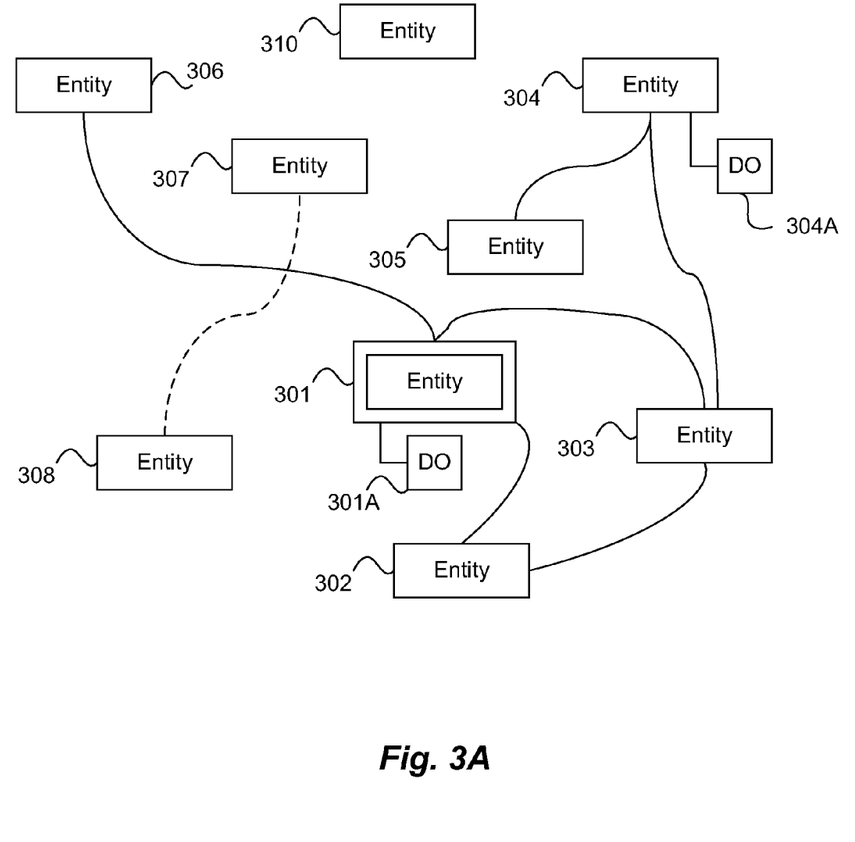
FIG. 3A illustrates determining frozen status of data objects based on entity relationships according to an embodiment of the present invention.

FIG. 3A illustrates determining frozen status of data objects based on entity relationships according to an embodiment of the present invention. FIG. 3A illustrates at least two networks of entities. For example, entities 301-306 are related in one network, and entities 307-308 are related in a second network, which is unrelated to entities 301-306. There is a third network as entity 310 is an isolated entity. In this example, a first data object 304A has been assigned to entity 304 and a second data object 301A has been assigned to entity 301. In this example, it is assumed that a sign-off has occurred and data object 301A has been frozen. A user may access data object 304A, and the system may determine that data object 304A is frozen based on the relationship between entity 304 and entity 301. In this example, since the data object 301A has been frozen as part of the sign-off, and since entity 304 is related to entity 301 (e.g., through intermediate entity 303), data object 304 may be designated as frozen as well.

As an example, embodiments of the present invention may include a registry. The registry may specify one or more entities that are "frozen related." Entities in the registry may be referred to as "frozen entities", to be distinguished from frozen data objects. Data objects assigned to frozen entities may or may not be frozen as described below. For example, a particular entity is specified in the registry if a data object assigned to the particular entity is frozen or if the particular entity is related to an entity having an assigned frozen data object. In this example, entity 301 is in the registry because data object 301A is frozen (data object 301A may have been signed off). Additionally, entities 302-306 are in the registry because these entities are related to entity 301 (e.g., in the network in FIG. 3A). Entities 307-308 are not related to a frozen entity, and are therefore not in the registry. These entities are referred to as "normal entities."

In one embodiment, determining the frozen status of a data object may include accessing path information that specifies a relationship path from one entity, through zero or more intermediate entities, to another entity. For example, a relationship path (or frozen walking path) between two entities in an entity network may be traversed to establish a relationship between an entity belonging to one data object and another data object. Relationship path information may be saved as metadata, for example, in a variety for forms. In one embodiment, the relationship path is unique. Referring to FIG. 3A, relationship path information between different entities may be stored as shown in Table 1:

TABLE 1

| Target Entity | Heading Entity | Frozen Walking Path |
|---|---|---|
| Entity 306 | Entity 301 | 306 → 301 |
| Entity 302 | Entity 301 | 302 → 303 → 301 |
| Entity 304 | Entity 301 | 304 → 303 → 301 |
| Entity 305 | Entity 301 | 305 → 304 → 303 → 301 |
| Entity 303 | Entity 301 | 303 → 301 |
| Entity 310 | NA | Isolated Entity |

Figure 3B:
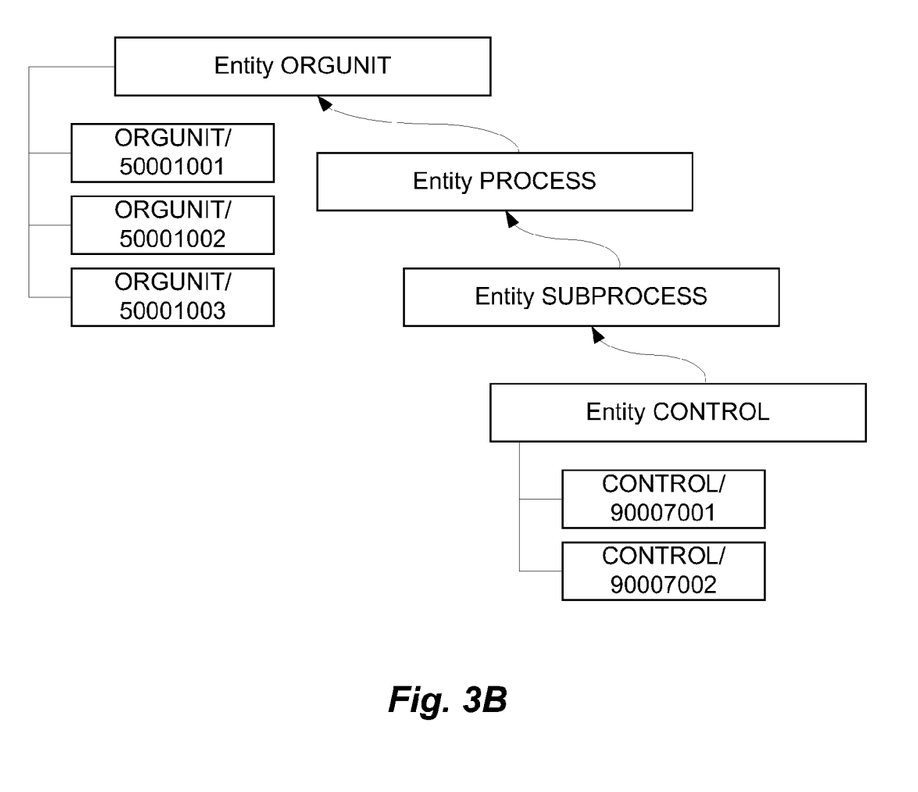
FIG. 3B is an example of entities and data objects according to an embodiment of the present invention.

In this example, entity 301 may be designated as a frozen heading entry (illustrated graphically as a double boundary around entity 301 in FIG. 3A). Frozen heading entity 301 defines the central node in the frozen entities network. For example, each organization unit owner may sign-off on his own organization unit on a specific month. After the sign-off action, all data objects related to this organization unit entity are frozen. In this case, the organization unit entity is the heading entity. In one embodiment, data objects have object identifications. For example, the object identification of each data object may specify the particular entity to which a particular data object is assigned or a database identifier. A unified object ID includes both the entity and database ID. For instance, for a particular corporation A, a corresponding entity may be "Corporate", and a database ID (sequence id) may be "12340000". In this case, a unified object ID may be "CORPORATE/12340000". Alternatively, a control may be named "Prevent unauthorized outgoing payment to fictitious vendors" with the object id "CONTROL/52340000", in which "Control" is the entity ID, and "52340000" is a technical id in the database. Referring again to FIG. 3A, if data object 301A, which is assigned to heading entity 301, has an object ID, then the object ID is the heading object ID. Specifically, if objects relating to organization unit are frozen, then organization unit entity (e.g., entity 301) is the heading entity, and the organization unit ID is heading object ID. As a specific example, if entity 301 is the "Heading Entity" (e.g., ORGUNIT" entity), then the data object ID of data object 301A (e.g., "ORGUNIT/50001001") and any other ORGUNIT data objects, is "Heading Object ID". Since entity 304 (e.g., "CONTROL") is not the "Heading Entity", then the object ID of data object 304A (e.g., "CONTROL/90007001") are not "Heading Object ID". Example ORGUNIT and CONTROL entities, and intermediate entities PROCESS and SUBPROCESS are illustrated in FIG. 3B. In this example, "Heading Entity ID" is just an alias for the objects IDs whose entity is "Heading Entity". So, no special storage is required. However, the following tables are examples for the storage of the metadata:

01. The registry for these four entities:

| Entity ID | Entity Name | Heading Entity | ... |
|---|---|---|---|
| ORGUNIT | Organization Unit | Yes | |
| PROCESS | Process | No | |
| SUBPROCESS | Sub-process | No | |
| CONTROL | Control | No | |

02. Frozen walking path/relationship path between entities:

| Auto Number | Walking Path ID | Step | From Entity | To Entity |
|---|---|---|---|---|
| 00000001 | CONTROL-TO-ORGUNIT | 01 | CONTROL | SUBPROCESS |
| 00000002 | CONTROL-TO-ORGUNIT | 02 | SUBPROCESS | PROCESS |
| 00000003 | CONTROL-TO-ORGUNIT | 03 | PROCESS | ORGUNIT |

03. Sign-Off frozen record, suppose we are using Frozen Date Range, not Frozen Date

| Auto Number | OBJECT_ID | FROZEN_RANGE_BEGIN | FROZEN_RANGE_END |
|---|---|---|---|
| 00000001 | ORGUNIT/50001001 | 20090101 | 20090131 |
| 00000002 | ORGUNIT/50001001 | 20090201 | 20090228 |
| 00000003 | ORGUNIT/50001001 | 20090301 | 20090331 |
| 00000004 | ORGUNIT/50001001 | 20090501 | 20090531 |
| 00000005 | ORGUNIT/50001001 | 20090601 | 20090631 |
| 00000006 | ORGUNIT/50001002 | 20090101 | 20090630 |
| 00000007 | ORGUNIT/50001003 | 20090101 | 20090331 |

From the records in the table above, the "Heading Object" "ORGUNIT/50001001" is frozen in the $1^{st}$ half of year 2009 except the month of April, for example. Therefore, all the Processes, Sub-processes, and Controls for April 2009 that have relationships with ORGUNIT/50001001 are editable (not frozen). But the other months of the $1^{st}$ half of year 2009 (e.g., January, February, March, May, and June), the data is read-only (frozen). The Heading Object ORGUNIT/50001002 is frozen in the $1^{st}$ half of year 2009. All the Processes, Sub-processes, Control that have relationships to this organization unit within the frozen date range are read-only (frozen). The Heading Object ORGUNIT/50001003 is frozen in the $1^{st}$ quarter of year 2009. All the Processes, Sub-processes, Control that have relationships to this organization unit within the frozen date range are read-only (frozen).

As another example, data objects to be frozen may be time dependable. Time dependable means that for a specified object, its attributes may be different for different times. For example, one company may be named "ABC Company" at one point in time, and then on Jun. 1, 2009, for example, the company's name may be changed to "DEF Company". Although the company name has been changed, the object ID is the same. When retrieving the company name from an Application Program Interface layer, for example, a date may be passed in to get the correct value from the data object. For instance, a data object may store data with associated time stamp attributes to track the time at which the data changes. Accordingly, when the data object is accessed, an associated time may be compared to a frozen time. If the time associated with the object meets the frozen date, then the first data object is frozen. For example, an attribute of a data object may have an associated date, and the frozen time is a frozen date. Accordingly, the data object is frozen if the date is before the frozen date. As another example, the frozen time may be a frozen date range. Accordingly, the data object is frozen if the date is within the frozen date range. In the first case, a frozen date means all objects before the date should not be changed. In the second case, the frozen data is a frozen time frame, which is a date range where the data objects within this time frame should not be changed. The system could either use frozen time frame or frozen date, for example. Similarly, in one embodiment, relationships between entities may be time dependable as well, which results in time dependent relationship (walking) paths and where the path may be determined using a time stamp.

Figure 4:
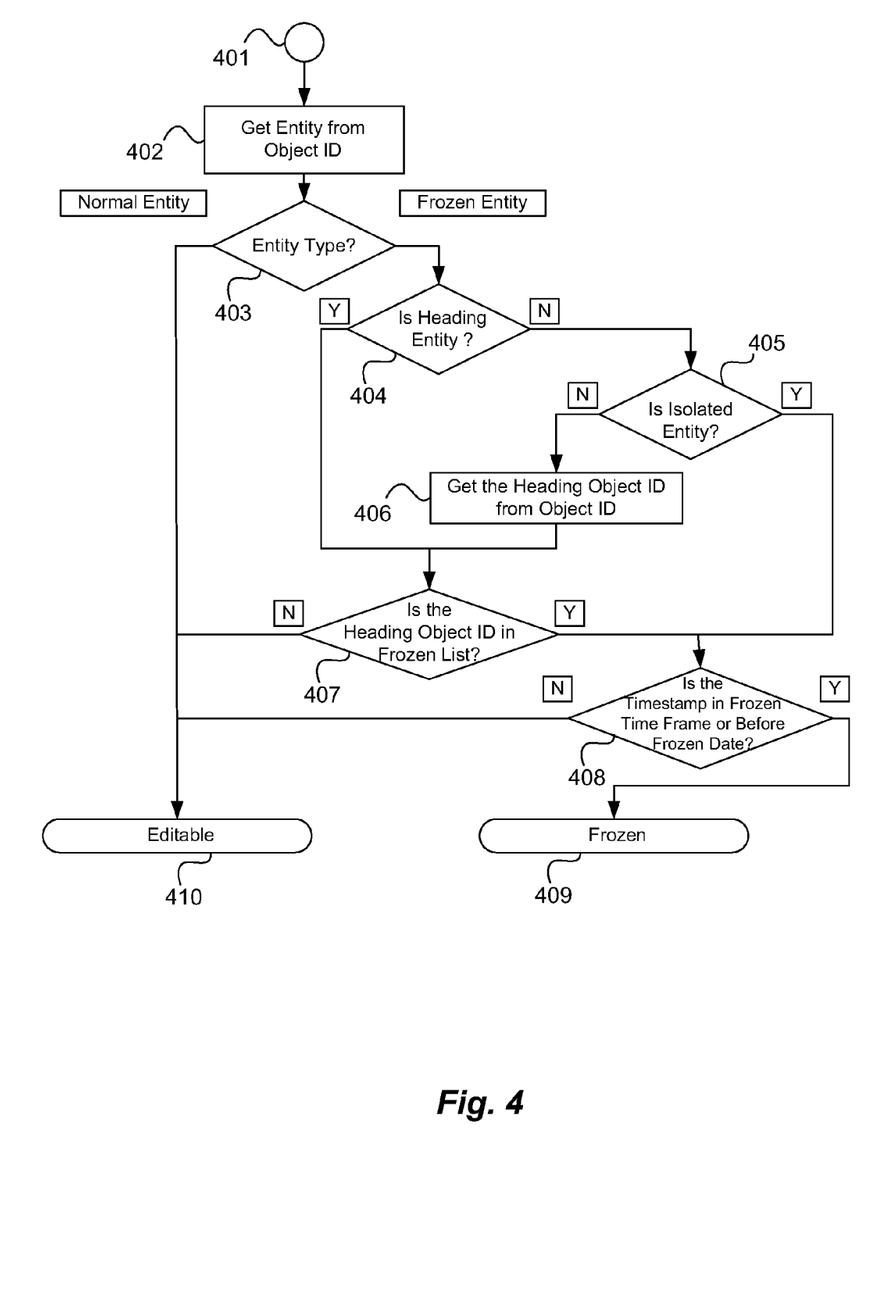
FIG. 4 illustrates an example method of determining whether or not a data object is frozen.

FIG. 4 illustrates an example method of determining whether or not a data object is frozen. In this example, a data object may be accessed by a user on a computer at 401. The data object may be one of a plurality of data objects in one or more computer software applications, for example. The data objects may be heterogeneous enterprise data—e.g., different data on different software systems. In one example, the method is implemented on a GRC system to handle data from SAP ERP, Oracle PeopleSoft, or Cisco systems. The plurality of data objects are assigned to a plurality of entities, each entity specifying a category, wherein each of the plurality of data objects belong to a specific entity. In response to the user accessing the data object, the process determines if the data object is frozen based on a relationship between a first entity and a second entity. For example, at 402, the process determines the entity to which the data object is assigned. For instance, the process may Get the Entity from the data object's ID. The process may then determine the entity type at 403. For example, a registry of entities may be accessed and the process may determine if the entity is in the registry. The registry may store frozen entities as described above. If the entity not in the registry, it may be a normal entity that is not frozen, and the process may move to 410 and allow the user to edit the data object. However, if the entity is in the registry, the process moves to 404. At 404, the process determines if the entity is a heading entity mentioned above. If the entity is a heading entity, the process moves to 407 described below. If the entity is not a heading entity, the process moves to 405. At 405, the process may access path information. The process may determine whether or not a frozen heading entity or any other entities are related to the entity using the path information. For example, the frozen walking path may define how to find the frozen object from the target Object ID (input parameter) to the Frozen Heading Object ID. If the entity is not related to any other entities, then the entity is an isolated entity, and the process moves to 408. However, if the path information indicates a relationship path to another entity, the system may determine whether or not another data object assigned to the other entity is frozen. For instance, the system may determine if the entity is related to a heading entity. If the entity is related to a heading entity, then the process obtains the heading object ID from the object ID of a frozen data object assigned to the frozen heading entity at 406. At 407, the process determines if the heading object ID (e.g., the entity component of the object ID) matches any of the entities in the registry of frozen entities at 407. If the heading object ID is not in the frozen list (the registry), then the data object is not related to any frozen heading entities and the data object is editable. However, if the heading object ID is in the frozen list (the registry), then the process extracts the time stamp from the data object and compares the time stamp to either a frozen time frame (e.g., a date range) or a frozen date. If the time stamp is outside the frozen time frame or before the frozen date, then the data associated with the time stamp is editable. However, if the time stamp is within the frozen time frame or after the frozen date, then the data associated with the time stamp is frozen at 409.

Example Pseudo Code

```
1) Get Heading Object ID from Object ID
Input Parameter: Object-ID
Output Parameter: Object-ID-Loop
01 Declare Object-Entity = GetEntityFromObjectID( Object-ID )
02 Declare Walking-Path = LoadWalkingPathFromMetaData( )
03 Declare Heading-Entity = LoadHeadingEntity( )
04 Declare Object-ID-Loop = Object-ID
05 Declare Entity-Loop
06
07 While ( GetNextEntity (Walking-Path, Entity-Loop) <>Heading-Entity )
08   Object-ID-Loop = GetNextObjectIDInPath( )
09   Entity-Loop = GetEntityFromObjectID( Object-ID-Loop )
10 Endwhile
11
12 Object-ID-Loop = GetNextObjectIDInPath( )
13
14 Return Object-ID-Loop
Note: The line 07 of the code above is not considering the time dependable walking path
mentioned above. If we consider this case, we need one more input parameter for timeframe,
as follows:
Input Parameter: Object-ID
Input Parameter: Timestamp
Output Parameter: Object-ID-Loop
...
06
```

```
07 While ( GetNextEntity (Walking-Path, Entity-Loop, Timestamp)
       <> Heading-Entity )
08
...
02) Is Object Frozen
Input Parameter: Object-ID
Input Parameter: Timestamp
Output Parameter: IsFrozen
01 // Nothing is frozen by default
02 IsFrozen = FALSE
03
04 Declare Object-Entity = GetEntityFromObjectID( Object-ID )
05 Declare Heading-Object-ID
06
07 If Object-Entity is NORMAL-ENTITY
08   Return IsFrozen
09 Endif
10
11 If Object-Entity is ISOLATED-ENTITY
12   IsFrozen = IsTimeStampInFrozenTimeframe( Timestamp )
13   Return IsFrozen
14 Elseif Object-Entity is HEADING-ENTITY
15   Heading-Object-ID = Object-ID
16 Else
17   Heading-Object-ID = Get_HeadingObjectID_From_ObjectID( Object-ID )
18 Endif
19
20 If Heading-Object-ID in FrozenObjectList
21    and IsTimeStampInFrozenTimeframe( Timestamp ) is True
22   IsFrozen = True
23 Endif
24
25 Return IsFrozen
Note: In line 12 the code above is using the Frozen Time Frame mentioned above, while if
we are using Frozen Date, then we can use another method as follows:
12   IsFrozen = IsTimeStampBeforeFrozenDate( Timestamp )
```

Figure 5:
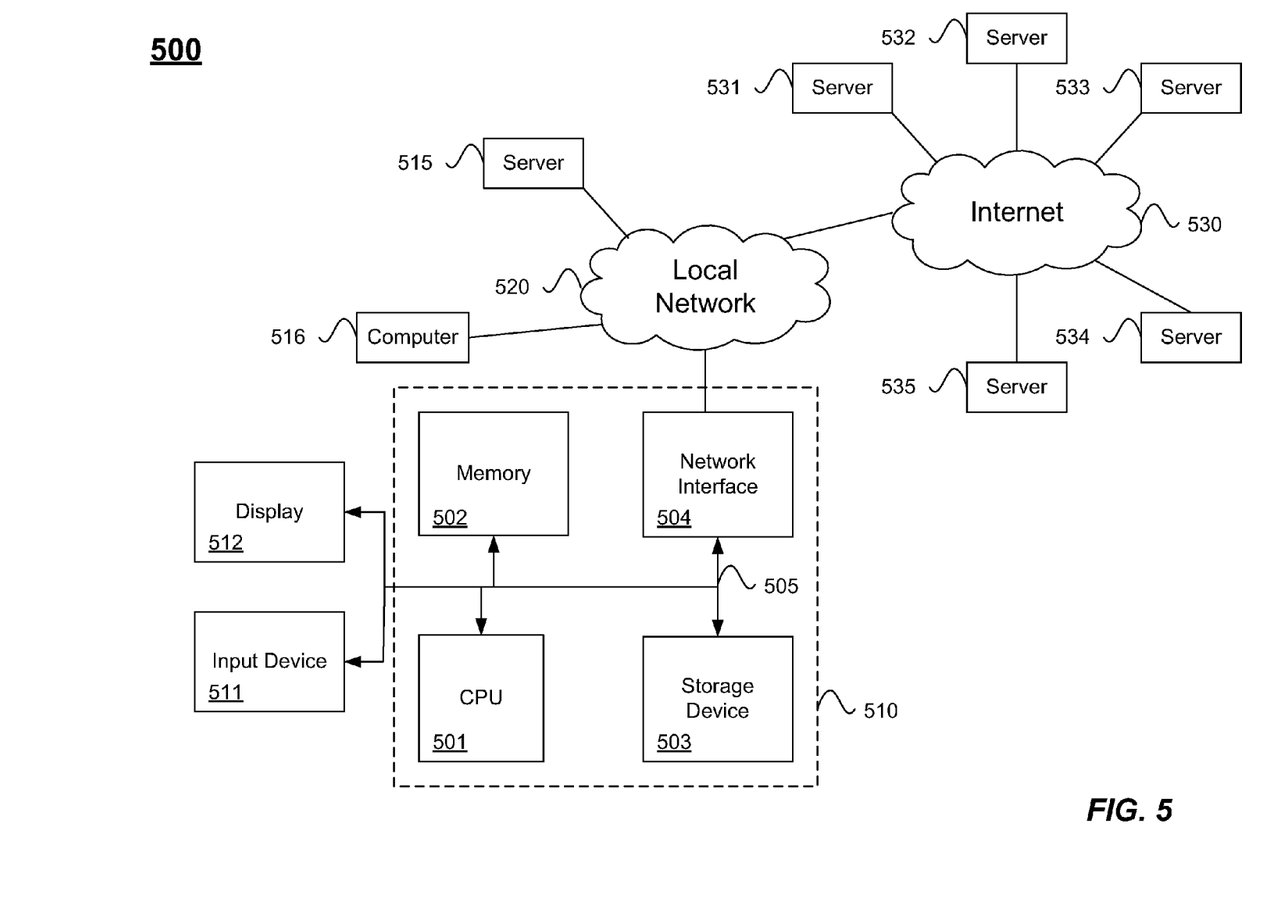
FIG. 5 is a block diagram of an example computer system and network for implementing embodiments of the present invention.

FIG. 5 is a block diagram of an example computer system and network 500 for implementing embodiments of the present invention. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above. This memory may also be used for storing variables or other intermediate information during execution of instructions to be executed by processors 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques or embodying the constructs above, for example.

Computer system 510 may be coupled via bus 505 to an output device, such as a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510, local network 520, and other computers 516 or servers 515. The network interface 504 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 504 sends and receives electrical, electromagnetic, or optical signals that carry digital data streams representing various types of information.

Computer system 510 can send and receive information, including messages or other interface actions, through the network interface 504 to an Intranet or the Internet 530. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. Different processes may be implemented on any computer system and send and/or receive information across a network, for example. In one embodiment, the techniques describe above may be implemented by software services on one or more servers 531-535, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, the data modeling guidelines described above are exemplary only and not limited to RDBMS or any particular media or method of saving data. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
accessing, by a user on a computing device, a first data object of a plurality of data objects in one or more computer software applications, wherein the plurality of data objects are assigned to a plurality of entities, each entity specifying a category, wherein each of the plurality of data objects belong to a specific entity, wherein the first data object is assigned to a first entity, wherein a second data object is assigned to a second entity, and wherein the second data object is frozen;
allowing the user to perform write actions on the first data object when a relationship between the first entity and the second entity indicates that the first data object is not frozen; and
denying the user from performing write actions on the first data object when the relationship between the first entity and the second entity indicates that the first data object is frozen, including determining if the first object is frozen by:
detecting the first entity to which the first data object is assigned;
accessing a registry of entities, wherein the registry specifies one or more of the plurality of entities, and wherein a particular is specified in the registry if a data object assigned to the particular entity is frozen or if the particular entity is related to an entity having an assigned frozen data object; and
detecting whether the first entity is in the registry.

2. The method of claim 1 wherein the first data object is determined to be frozen or not frozen in response to the first data object being accessed.

3. The method of claim 1, each data object of the plurality of data objects comprising an object identification, the object identification specifying the particular entity to which a particular data object is assigned and a database identifier.

4. The method of claim 1, said determining further comprising:
accessing path information, the path information specifying a relationship path from the first entity, through zero or more intermediate entities, to the second entity.

5. The method of claim 4 wherein the relationship path is unique.

6. The method of claim 4 wherein the relationship path is time dependent and wherein the relationship path is determined using a time stamp.

7. The method of claim 4, said determining further comprising:
determining whether or not the second entity is related to the first entity using the path information; and
if the second entity is related to the first entity, determining whether or not the second data object assigned to the second entity is frozen.

8. The method of claim 7 wherein the first data object has a plurality of attribute values each having an associated time, said determining further comprising comparing at least one associated time to a frozen time, wherein if the associated time meets a frozen date, then the first data object is frozen.

9. The method of claim 8 wherein the associated time is a date, wherein a first attribute of the first data object has an associated date, wherein the frozen time is a frozen date, and wherein the first data object is frozen if the date is before the frozen date.

10. The method of claim 8 wherein the associated time is a date, wherein a first attribute of the first data object has an associated date, wherein the frozen time is a frozen date range, and wherein the first data object is frozen if the date is within the frozen date range.

11. A non-transitory computer-readable medium containing instructions for controlling a computer system to perform a method, the method comprising:
accessing, by a user on a computer, a first data object of a plurality of data objects in one or more computer software applications, wherein the plurality of data objects are assigned to a plurality of entities, each entity specifying a category, wherein each of the plurality of data objects belong to a specific entity, wherein the first data object is assigned to a first entity, wherein a second data object is assigned to a second entity, and wherein the second data object is frozen;
allowing the user to perform write actions on the first data object when a relationship between the first entity and the second entity indicates that the first data object is not frozen; and
denying the user from performing write actions on the first data object when the relationship between the first entity and the second entity indicates that the first data object is frozen, including determining if the first object is frozen by:
detecting the first entity to which the first data object is assigned;
accessing a registry of entities, wherein the registry specifies one or more of the plurality of entities, and wherein a particular entity is specified in the registry if a data object assigned to the particular entity is frozen or if the particular entity is related to an entity having an assigned frozen data object; and
detecting whether the first entity is in the registry.

12. The non-transitory computer-readable medium of claim 11 wherein the first data object is determined to be frozen or not frozen in response to the first data object being accessed.

13. The non-transitory computer-readable medium of claim 11, each data object of the plurality of data objects comprising an object identification, the object identification specifying the particular entity to which a particular data object is assigned and a database identifier.

14. The non-transitory computer-readable medium of claim 11, said determining further comprising:
accessing path information, the path information specifying a relationship path from the first entity, through zero or more intermediate entities, to the second entity.

15. The non-transitory computer-readable medium of claim 14 wherein the relationship path is unique.

16. The non-transitory computer-readable medium of claim 14 wherein the relationship path is time dependent and wherein the relationship path is determined using a time stamp.

17. The non-transitory computer-readable medium of claim 14, said determining further comprising:
determining whether or not the second entity is related to the first entity using the path information; and
if the second entity is related to the first entity, determining whether or not the second data object assigned to the second entity is frozen.

18. The non-transitory computer-readable medium of claim 17 wherein the first data object has a plurality of attribute values each having an associated time, said determining further comprising comparing at least one associated time to a frozen time, wherein if the associated time meets a frozen date, then the first data object is frozen.

* * * * *